Sept. 2, 1930.   R. FITZPATRICK   1,774,878
PIPE HANGER
Filed Nov. 19, 1929
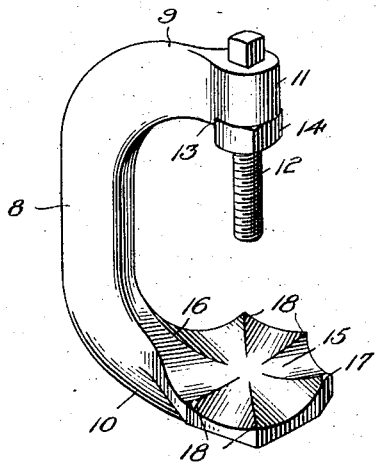
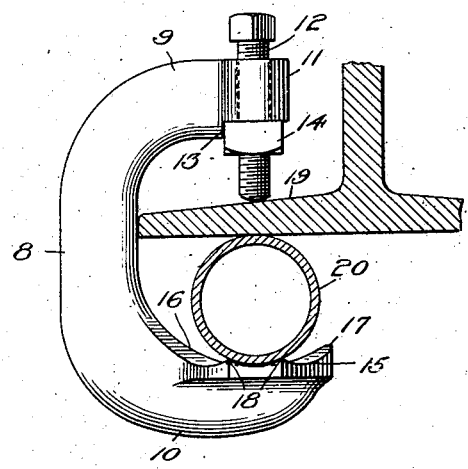
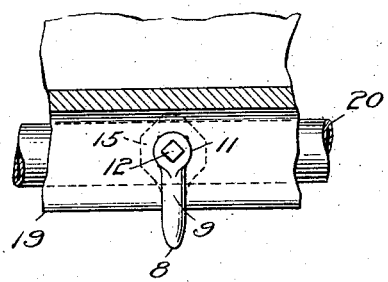
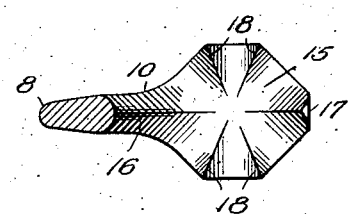
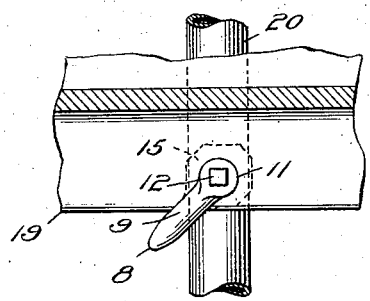
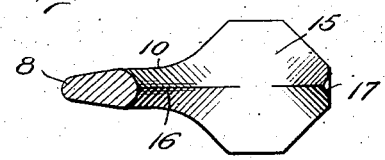
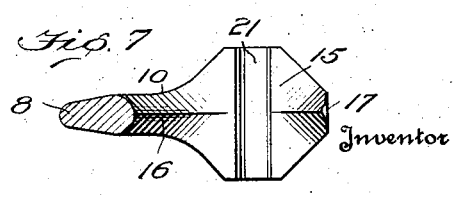
Inventor
Ray Fitzpatrick
By Dipe and Kirchner
Attorney Patented Sept. 2, 1930

1,774,878

UNITED STATES PATENT OFFICE

RAY FITZPATRICK, OF EAST PALESTINE, OHIO

PIPE HANGER

Application filed November 19, 1929. Serial No. 408,380.

My invention relates to pipe hangers, and more particularly to devices generically known by this name which are designed to support a pipe, shaft, conduit or the like in a building by engaging the same with the structural iron beams or girders constituting the framework of the building.

One object of my invention is to provide a device of the character indicated which will be in a sense a universal hanger, that is to say, one which will accommodate pipes or conduits of any cross sectional contour and of varying diameters within certain relatively wide limits, and which will securely support the pipe from the beam whether the pipe extends parallel with the beam, at right angles thereto or at any intermediate angle.

A further object is to provide a hanger which will be of exceedingly simple and inexpensive construction and at the same time very durable and capable of being quickly and easily applied in operative position.

A still further object is to provide a hanger, the principal part of which may be an iron casting or formed of malleable iron, forged steel or the like, and which may be made adequately strong for all purposes at a minimum cost, and which includes no other parts except a common bolt and nut.

Further objects and advantages of my invention will sufficiently appear from the detailed description hereinafter of the invention in one form of embodiment, taken in conjunction with the appended drawings which form part of this application for Letters Patent and in which the same reference characters designate the same parts in the several views.

In the drawings:

Figure 1 is a perspective view of one type of pipe hanger constructed according to the principles of my present invention;

Fig. 2 is a side elevational view of the hanger secured in operative position to a beam and connecting a pipe thereto;

Fig. 3 is a horizontal section through the body of the hanger, showing the foot portion in plan;

Fig. 4 is a horizontal section through an I-beam showing the hanger in operative position securing a pipe in parallel relation with the beam;

Fig. 5 is a view similar to Fig. 4, but showing the hanger securing a pipe disposed at right angles with the beam; and Figs. 6 and 7 are views similar to Fig. 3 but showing modified types of foot portions.

Referring to the drawings, and first to Fig. 1, the reference numeral 8 thereon designates the body portion of my improved hanger, which is preferably a rugged casting of iron or the like provided with a head portion 9 and a foot portion 10 extending from the same side of the body in a generally right angular direction, giving to the casting, when viewed in side elevation, somewhat the form of the letter C.

The extreme outer end of the head portion is preferably enlarged, as shown at 11, and this enlargement is provided with a perforation, formed in the casting operation or by drilling afterwards, which passes through the head in a direction parallel with the body portion 8.

A bolt 12 having a cup-pointed end is received through this perforation, and is associated in screw-threaded relation with the head. It is obvious that this relation may be effected by threading the perforation through the head, but I have found that it is preferable in the interests of economy and efficient operation to employ the means shown in Figs. 1 and 2.

According to this preferred construction, the enlargement 11 is made slightly shorter in a direction parallel with its perforation than the remainder of the head portion 9. This results in leaving a slight but well defined square shoulder 13 on the head 9 adjacent the under side of the enlargement 11. The shoulder is so proportioned that a square nut 14 positioned in line with the perforation to engage the bolt 12 will bear against the shoulder and be prevented from turning. It will be appreciated that by this construction, any stripping of threads caused by the imposition of excessive force on the bolt 12 will affect only the bolt 12 or the nut 14, so that replacement of either of these inexpensive parts will restore the hanger to its original usefulness and efficiency.

The foot portion 10 is extended laterally to form a relatively broad pipe engaging face 15 of preferably polygonal contour. A feather or ridge 16 is cast in this foot diametrically thereof in the plane of the body 1, and extends from the inner side of the body, completely across the face 15, to terminate in a slightly upturned lip 17 at the outermost portion of the foot.

In the preferred form of embodiment of my present invention, illustrated in Figs. 1, 2 and 3, I provide, in addition to the ridge 16, two other ridges 18, which cross the ridge 16 at the center of the face 15, and make acute angles therewith. In a manner similar to the ridge 16, these transverse ridges 18 are carried upwardly from the face 15 at their outer ends, so that the face of the foot portion 10 is curved substantially cylindrically between adjacent ridges to form a pipe seat. All the ridges are depressed substantially to a vanishing point at the center of the face 15, as clearly appears from Figs. 1 and 3.

It is believed that the manner of functioning of the hanger which I have described will be sufficiently obvious. It will be appreciated that the hanger is designed to be placed with its head and foot portions on opposite sides of the flange 19 of a beam or similar structural member. The pipe, conduit, shaft bearing, or other element to be supported from the beam, is then placed between the foot of the hanger and the beam flange, and bolt 12 turned in nut 14 until the pipe 20 and beam flange 19 are in tight engagement. It will be clear that whatever the cross sectional contour of the pipe, and whatever its diameter, within the physical limits of the hanger, as soon as the bolt 12 is turned down home on the flange, the pipe will be held in one of the seats formed by the ridges 18, 18 or 18, 16, and will be maintained against the beam flange by four bearing points on the foot portion and by the cup-point of the bolt 12, which is disposed directly over the center point of the foot portion, and is consequently diametrically positioned with relation to the supported pipe.

Figs. 2 and 4 show a pipe supported in parallel relation with the beam flange. It will be noted that in this use of the hanger, the head and foot portions thereof are disposed at right angles to the beam flange, and the transverse ridges 18 engage the under surface of the pipe to maintain the foot and the pipe in fixed relation.

Fig. 5 shows a pipe secured to a beam flange at right angles thereto. As clearly shown by the figure, this use of the hanger requires the head and foot portions to be disposed at a 45° angle to both the pipe and the edge of the beam flange. In this positon of the pipe and foot the pipe is held positively in place by engagement with the central ridge 16 and one of the transverse ridges 18.

It is obvious that while I have shown the pipe and beam flange associated in 180° and 90° relations only, any intermediate relation may readily be effected by the simple expedient of disposing the hanger on that side of the pipe which makes an obtuse angle with the edge of the beam flange.

The modifications shown in Figs. 6 and 7 contemplate changes over the hanger above described only in the type of foot, the other elements remaining the same.

In Fig. 6 I have shown a type of foot which eliminates the transverse ridges 18, but is in other respects like the foot hereinabove described.

In Fig. 7 the foot is similar to that of Fig. 6, except that it is provided transversely across its face with a shallow groove 21, which cooperates in positively securing a pipe laid transversely across the face of the foot in an obvious manner.

It is to be noted that hangers provided with the modified foot forms shown in Figs. 6 and 7 are, like the preferred embodiment of my invention, capable of carrying a pipe at any angle to a beam flange.

While, as has been explained hereinabove, the preferred embodiment of my invention is that illustrated in Figs. 1, 2 and 3, I have found that the modifications shown in Figs. 6 and 7 are desirable for some uses, principally where the pipe is to be supported parallel to the beam flange. These modified forms have a certain desirability in that they may easily be cast without the use of a core to form any part of the foot. It is to be understood that these modifications, and others which will be clear to persons skilled in this art, are to be deemed within the principle of my invention considered in its broader aspects, and within the scope and purview of the appended claims.

Having thus described my present invention what I claim and desire to secure by Letters Patent is:

1. A pipe hanger including a body portion having at one end means for engaging a support and at its other end a broad faced foot provided on its upper surface with a plurality of pipe seats disposed in angular relation to each other.

2. A pipe hanger including a body portion having at one end means for engaging a support and at its other end a broad faced foot provided on its upper surface with a plurality of pipe seats disposed in angular relation to each other, each of said seats being a portion of a substantially cylindrically curved surface.

3. A pipe hanger including a body portion having at one end means for engaging a support and at its other end a broad faced foot provided on its upper surface with a plurality of curved pipe seats, each seat comprising a pair of substantially triangular areas having a common apex at the center portion of the foot and bases at opposite sides of the foot.

4. A pipe hanger as claimed in claim 1, in which the pipe seats are defined by ridges in the upper surface of the foot radiating from the approximate center thereof.

5. A pipe hanger as claimed in claim 1, in which the pipe seats are defined by a plurality of ridges in the upper surface of the foot, said ridges meeting in the central portion of the foot and each pair of adjacent ridges making an angle less than a right angle.

In testimony whereof I affix my signature.

RAY FITZPATRICK.